United States Patent
Laslo

(10) Patent No.: US 10,824,249 B2
(45) Date of Patent: Nov. 3, 2020

(54) STYLUS FOR ZERO FORCE ACTIVATION

(71) Applicant: Microsoft Technology Licensing, LLC, Redmond, WA (US)

(72) Inventor: Ori Laslo, Rehovot (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/377,096

(22) Filed: Apr. 5, 2019

(65) Prior Publication Data

US 2020/0319725 A1    Oct. 8, 2020

(51) Int. Cl.
*G06F 3/0354* (2013.01)
*G06F 3/041* (2006.01)
*G06F 3/038* (2013.01)
*G06F 3/01* (2006.01)

(52) U.S. Cl.
CPC .......... *G06F 3/03545* (2013.01); *G06F 3/016* (2013.01); *G06F 3/0383* (2013.01); *G06F 3/04162* (2019.05)

(58) Field of Classification Search
CPC .... G06F 3/03545; G06F 3/016; G06F 3/0383; G06F 2203/014; G06F 3/01; G06F 2203/0331
See application file for complete search history.

(56) References Cited

U.S. PATENT DOCUMENTS

| 5,177,472 A | 1/1993 | Taniishi et al. |
| 5,565,632 A | 10/1996 | Ogawa |
| 5,902,968 A * | 5/1999 | Sato .................. G06F 3/03545 178/19.01 |
| 9,665,189 B2 | 5/2017 | Wang et al. |
| 9,785,263 B2 | 10/2017 | Curtis |
| 9,886,088 B2 | 2/2018 | Dietz et al. |
| 2009/0135164 A1* | 5/2009 | Kyung .................. G06F 3/016 345/179 |
| 2013/0271431 A1 | 10/2013 | Besperstov |
| 2013/0321359 A1 | 12/2013 | Zeliff et al. |
| 2014/0043242 A1* | 2/2014 | Dietz .................. G06F 3/03545 345/173 |
| 2014/0093708 A1* | 4/2014 | Yamada .................. G06F 3/041 428/203 |
| 2014/0245139 A1* | 8/2014 | Lee .................... G06F 3/04842 715/702 |
| 2014/0340328 A1* | 11/2014 | Kameyama ......... G06F 3/03545 345/173 |
| 2015/0015549 A1 | 1/2015 | Lu et al. |

(Continued)

OTHER PUBLICATIONS

Liang, et al., "GaussSense: Attachable Stylus Sensing Using Magnetic Sensor Grid", In Proceedings of the 25th Annual ACM Symposium on User Interface Software and Technology, Oct. 7, 2012, pp. 319-325.

(Continued)

*Primary Examiner* — Sanjiv D. Patel

(57) ABSTRACT

In various examples there is a stylus for use with a digitizer. The stylus comprises a shaft running on a longitudinal axis of the stylus and having a stylus tip at a tip end of the shaft. The stylus has a vibration generator configured to vibrate the stylus tip along the longitudinal axis. The stylus also has a detector configured to detect the vibration causing the stylus tip to contact a surface external to the stylus.

20 Claims, 10 Drawing Sheets

(56) References Cited

U.S. PATENT DOCUMENTS

| | | | |
|---|---|---|---|
| 2015/0042625 A1* | 2/2015 | Yamada | G06F 3/0321 |
| | | | 345/179 |
| 2015/0212578 A1* | 7/2015 | Lor | G06F 3/016 |
| | | | 345/173 |
| 2016/0334890 A1 | 11/2016 | Holsen | |
| 2016/0378208 A1 | 12/2016 | Shahparnia et al. | |
| 2017/0108928 A1* | 4/2017 | Clements | G06F 3/03545 |
| 2017/0131817 A1 | 5/2017 | Wong et al. | |
| 2018/0235017 A1* | 8/2018 | Sakamoto | G06F 3/041 |
| 2018/0329526 A1* | 11/2018 | Peretz | G06F 3/0383 |
| 2019/0384402 A1* | 12/2019 | Huizar | G06F 3/016 |

OTHER PUBLICATIONS

Wang, et al., "Enhancing Pen-based Interaction Using Electrovibration and Vibration Haptic Feedback", In Proceedings of the CHI Conference on Human Factors in Computing Systems, May 6, 2017, pp. 3746-3750.

"International Search Report and Written Opinion Issued in PCT Application No. PCT/US20/025098", dated Jun. 18, 2020, 10 Pages.

* cited by examiner

STYLUS FOR ZERO FORCE ACTIVATION

BACKGROUND

Styli for use with digitizer control panels are widely used in tablet computers and other touch screen devices. Users are able to operate a stylus to draw electronic ink on a tablet computer or to operate a graphical user interface for example.

The embodiments described below are not limited to implementations which solve any or all of the disadvantages of known styli for use with digitizer control panels.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a stylus for use with a digitizer. The stylus comprises a shaft running on a longitudinal axis of the stylus and having a stylus tip at a tip end of the shaft. The stylus has a vibration generator configured to vibrate the stylus tip along the longitudinal axis. The stylus also has a detector configured to detect the vibration causing the stylus tip to contact a surface external to the stylus.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

The term "zero force event" is used herein to refer to an event when a stylus is positioned by a user so that it contacts a surface very gently, with minimal or no impetus or force of the stylus against the surface. The user moves the stylus into a position where the stylus contacts the surface but so that the velocity of the stylus is approximately zero when the stylus comes into contact with the surface. Because the stylus comes into contact with the surface when the velocity of the stylus is approximately zero, there is little or no reactive force from the surface towards the stylus. The contact between the stylus and the surface is referred to herein as independent contact since the stylus and the surface are effectively independent of one another. Zero force events often either go undetected, or are detected as hover events. A hover event occurs where a stylus is close to a surface, such as a digitizer panel, but without physically contacting the surface.

The term "zero force activation" is used herein to refer to independent contact between a stylus and a surface which triggers a host computer, hosting a digitizer panel, to move from a stylus hover mode into an inking mode. During an inking mode stylus detection events on the digitizer panel are interpreted as electronic ink whereas in a hover mode, touch stylus detection events on the digitizer panel are not interpreted as electronic ink.

In various examples described herein a stylus has a vibrating tip, so that when independent contact between a stylus and a surface occurs, vibration of the stylus tip generates contact between the stylus and the surface which is not independent contact and which is detectable by a detector at the stylus and/or a digitizer panel.

To aid understanding of the present technology FIGS. 1 to 4 are now described which explain how a stylus and digitizer panel operate.

Figure 1:
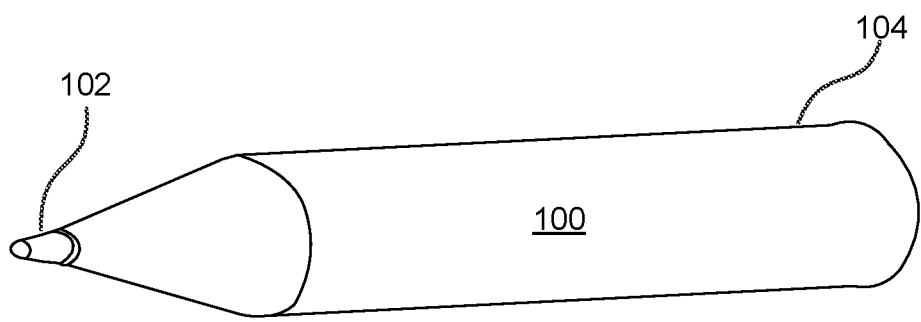
FIG. 1 is a perspective view of a stylus.

FIG. 1 is a schematic view of an example stylus 100 with a tip 102 end and a distal end 104. The stylus incorporates a plurality of components which are not visible in FIG. 1, such as one or more transmitters, a printed circuit board, a power mechanism and other components. The stylus has a vibration generator and a detector as described in more detail with reference to FIG. 5. The vibration generator generates vibration of the stylus tip and the detector detects contact between the stylus tip and a surface external to the stylus which occurs during the vibration of the stylus tip or at other times.

Figure 2:
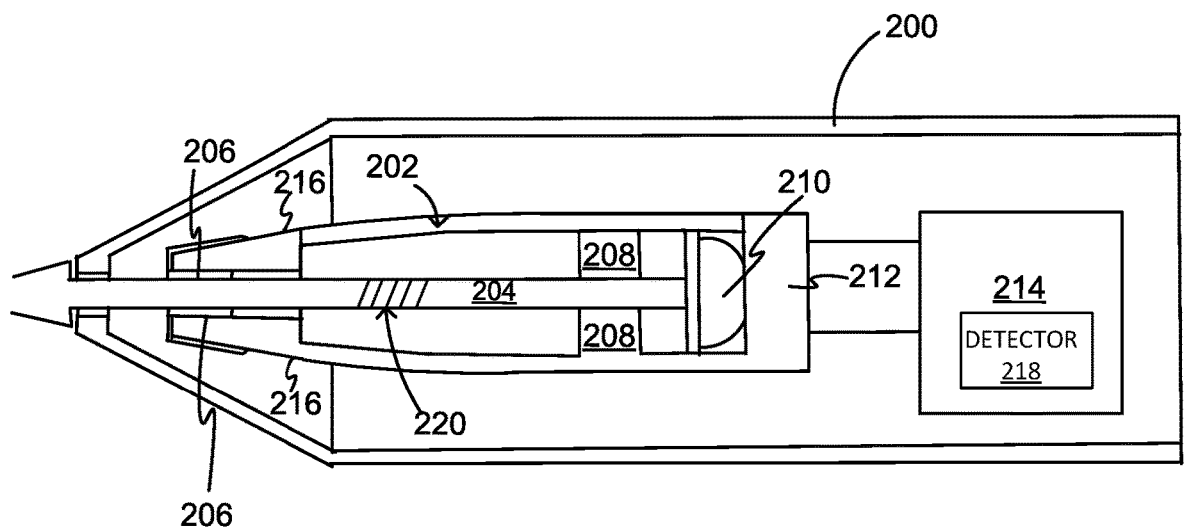
FIG. 2 is a longitudinal cross section through the stylus of FIG. 1.

FIG. 2 is a cross section through an example stylus, such as the stylus 100 of FIG. 1 showing a stylus housing 200. In this example the stylus is constructed using a capsule 202 for ease of manufacture since the capsule is constructed as a single unit which is assembled into any of a variety of stylus housings of different shapes and styles. FIG. 2 is given in this document to aid understanding of the technology background in order that an example of stylus construction is known to the reader. However, it is not intended to limit the scope of the technology to the particular construction of FIG. 2 since other designs of stylus are used in some embodiments as described in more detail with reference to FIG. 5 below. Within the stylus is a capsule 202 which has a vibration generator (shown in this example as a coil 220 around the shaft 204 where the coil is driven by an alternating current and the part of the shaft 204 within the coil is magnetic) and a detector 218 and which are described in more detail with reference to FIG. 5 below. The capsule 202 has a shaft 204 with the stylus tip 102 at one end of the shaft 204 protruding from the capsule 202 and stylus housing 200. The shaft 204 runs generally parallel to the length of the stylus. The distal end of the capsule 202 is connected to a printed circuit board 214 and one or more other components in the stylus housing 200 such as a power mechanism. The power mechanism is a battery or a mechanism to receive power from a digitizer.

The capsule 202 has bearing surfaces 208 which act to minimize motion of the shaft in a direction perpendicular to the longitudinal axis of the shaft. The longitudinal axis of the shaft runs generally parallel to the length of the stylus. At the distal end of the shaft 204 is a force sensor 210 which abuts an end wall 212 of the capsule 202. The tip end of the force sensor 210 has two printed antennas 206, 216 on its outer surface. One of the printed antennas 206, the one closest to the tip, is connected to the shaft by a metallic track and acts as the tip antenna (that is the antenna which transmits a signal to the digitizer. The other antenna 216 acts as a tilt antenna. Signals from a printed circuit board within the stylus are sent to the antennas over metallic tracks on a surface of the capsule housing. In some cases, signals from the printed circuit board 214 to the tip antenna, which incorporates the tip of shaft 204, travel on a metallic track from the inner surface of an end wall of the capsule 202 to the shaft 204.

In some cases the stylus 100 incorporates a spring between the capsule 202 and the printed circuit board 214 in order to bias the capsule 202, and hence the shaft 204, towards the tip end of the stylus 100. In some cases the capsule 202 incorporates one or more springs between the bearing surfaces 208 and the distal end of the shaft 204 and these act to bias the shaft 204 towards the tip 102.

In various embodiments of the present technology the capsule 202 incorporates a vibration generator and a detector as described in more detail below with reference to FIG. 5.

Figure 3:
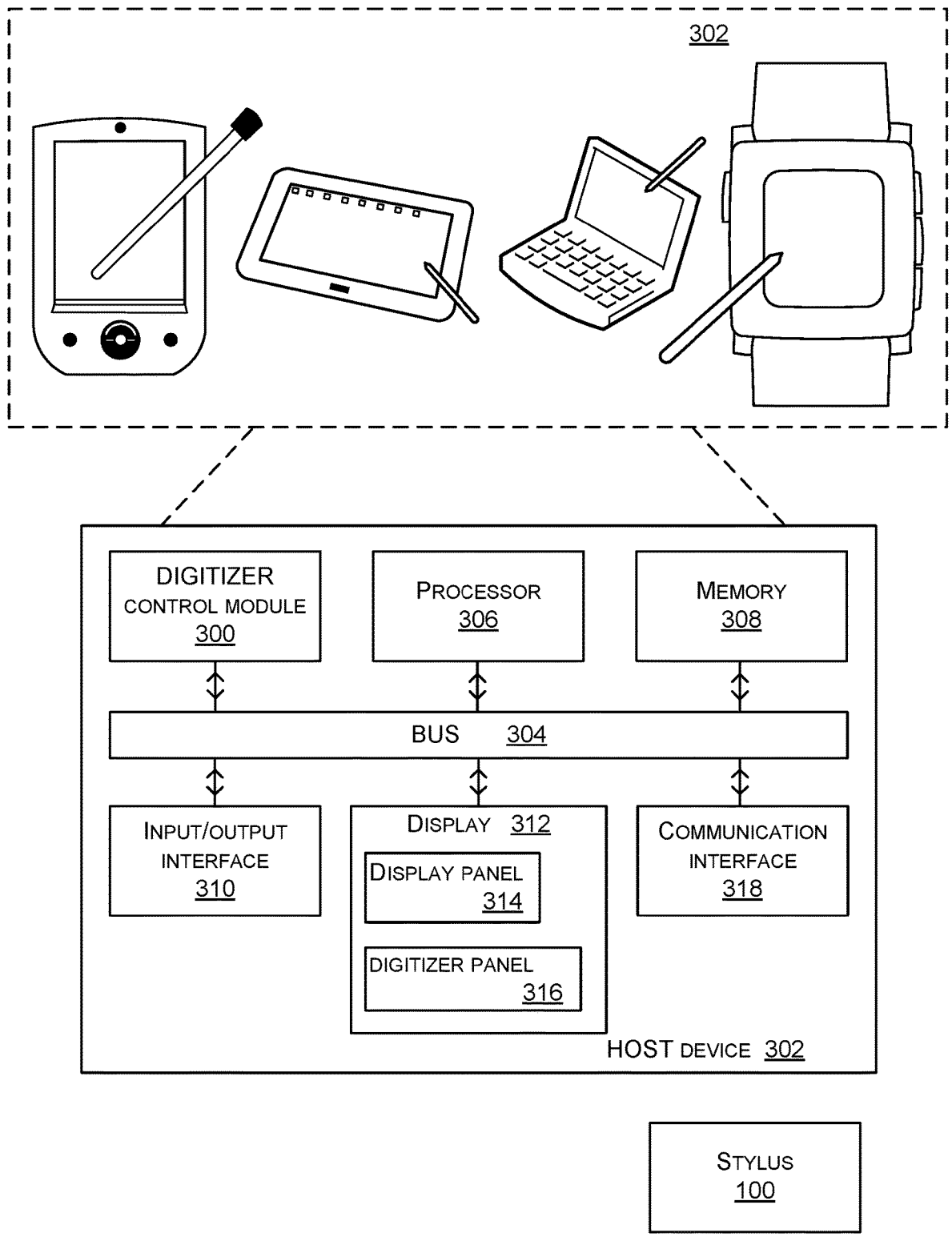
FIG. 3 is a schematic diagram of a computing device with a digitizer panel, and also showing a stylus.

General operation of a stylus and digitizer panel is now explained to aid understanding of the present technology. FIG. 3 is a schematic diagram of an electronic device 302 with a touch sensor panel 316 (referred to as a digitizer herein for brevity) and a digitizer control module 300. Together the digitizer 316 and the digitizer control module 300 form a digitizer device. The electronic device 302 is a smart phone, tablet computer, laptop computer, smart watch or any other type of electronic device with a digitizer 316. The electronic device has at least one processor 306, a memory 308, a communication interface 318 such as a radio communications transceiver, a network card, or any other communication interface for enabling wired or wireless communications with other computing entities. The electronic device 302 has an input/output interface 310 for controlling outputs from the electronic device 302 and for controlling inputs received at the electronic device 302. The electronic device 302, in some cases, has a display 312 although this is not essential. The display 312 comprises a display panel 314 which may be located in front of or behind the digitizer 316 such as in a conventional smart phone, tablet computer, or smart watch. In some cases the digitizer 316 is a touch pad which is located remote from the display panel 314 as in the case of a laptop computer such as that illustrated in FIG. 3. A bus 304 connects various components of the electronic device 302 such as the digitizer control module 300, the processor 306, the memory 308, the input/output interface 310, the display 312 and the communication interface 318. In the example of FIG. 3 the digitizer 316 is shown as part of the display 314 but this is not essential as mentioned above.

The digitizer 316 comprises a first array of electrodes arranged substantially parallel with one another and a second array of electrodes arranged substantially parallel with one another. In some implementations the electrodes in the first array are row electrodes positioned substantially perpendicular to the electrodes in the second array (column electrodes) to form a grid or matrix. While the row electrodes may be referred to as transmit electrodes and the column electrodes may be referred to as receive electrodes, these designations may be reversed with no change in meaning. However, it is not essential for the electrodes to be arranged in a grid. In some cases the row electrodes intersect each column electrode an at angle that is not perpendicular thereby forming a sensor having the form of a parallelogram. In some cases the electrodes form a more complex pattern in which any two rows or columns are not necessarily parallel, or not necessarily laid out along straight lines.

Where the sensor panel is used in front of or within a display (such as a liquid crystal display) the digitizer 316 is substantially transparent to visible wavelengths of light. Specifically, the electrodes in the digitizer 316 are made from transparent conductive material (for example, indium tin oxide), or alternatively, are made from opaque material but with traces so small as to be inconspicuous). In other implementations, the digitizer 316 is not positioned within, in front or behind a display but rather is positioned within a touch pad distinct from the display of the electronic device. The digitizer 316 is used to measure the capacitance from each row to each column of the electrodes in order to measure the position of an input medium such as a stylus or a finger.

Figure 4:
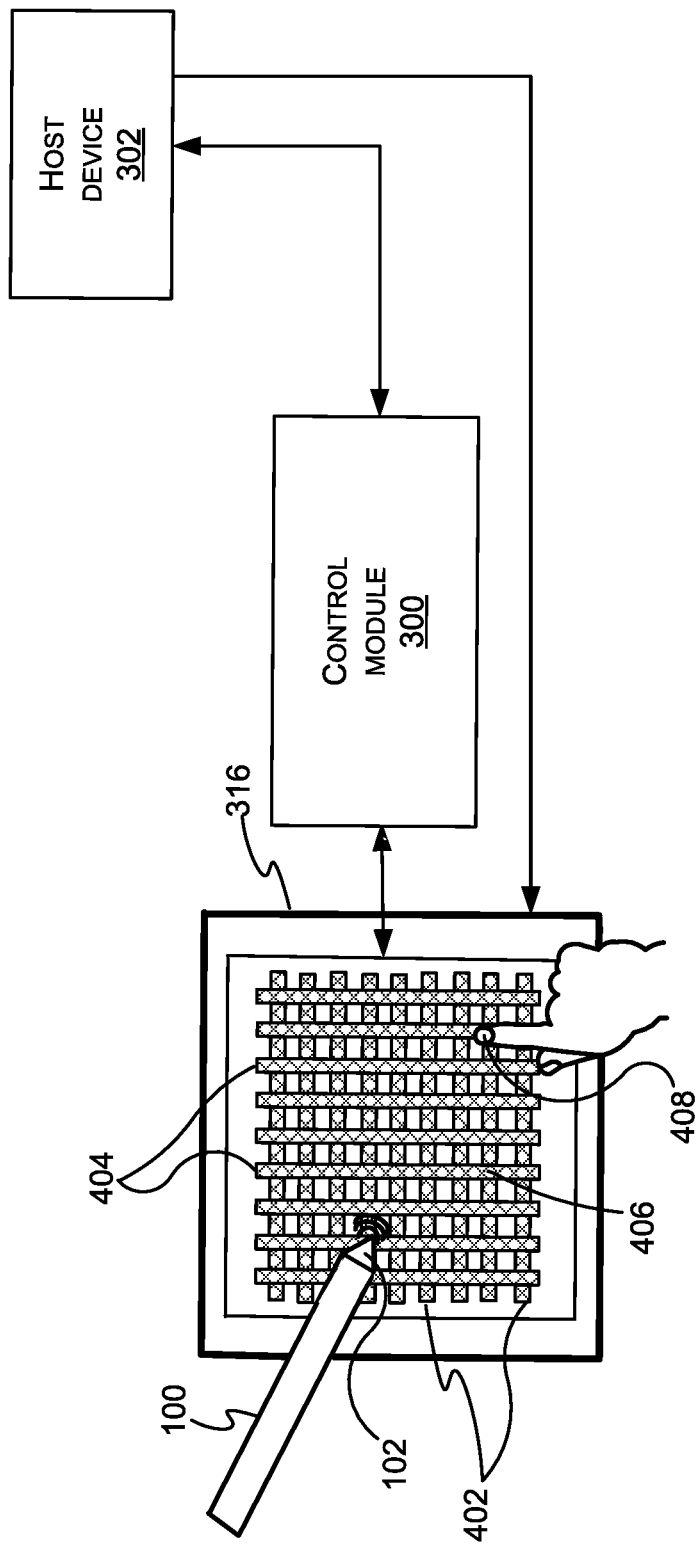
FIG. 4 is a schematic diagram of a digitizer, control module and a host device.

FIG. 4 shows the digitizer 316 in more detail in a case where the electrodes of the digitizer 316 are arranged in a grid to form a grid based capacitive sensor. Stylus 100 transmits an electromagnetic signal which is detected by the digitizer 316 also referred to as a capacitive digitizer sensor. Touch of one or more fingers 408 or other conductive objects is also detectable by the capacitive digitizer sensor. The stylus 100 transmits one or more signal bursts and/or pulses that are transmitted at a defined repetition rate. In some examples, a control module 300 of the digitizer 316 manages a synchronization signal for synchronizing signal bursts emitted by stylus 100 with sampling windows for sampling output from the digitizer 316. Optionally one or more signal bursts and/or pulses are transmitted by stylus 100 including information regarding operation of stylus 100 and/or pressure applied on a tip 102 of the stylus. The signal bursts transmitted by stylus 100 are picked up by one or more of the electrodes of the digitizer 316 on both the horizontal and vertical axes of the grid. In some examples the information is decoded by digitizer circuitry in the control module 300. The location of the stylus tip is computed by the control module 300 and sent to host device 302 which is a computing device with which the digitizer 316 is associated.

Optionally a mutual capacitance detection method and/or a self-capacitance detection method are applied on the digitizer 316 for sensing interaction with fingertip 408. The digitizer control module 300 sends a triggering pulse and/or interrogation signal to one or more electrodes 402, 404 of the digitizer 316 and to sample output from electrodes 402, 404 in response to the triggering and/or interrogation. In some embodiments some or all of the electrodes 402 along one axis of the grid are interrogated simultaneously or in a consecutive manner, and in response to each interrogation, outputs from electrodes 404 on the other axis are sampled. This scanning procedure provides for obtaining output associated with each junction 406 of the grid. This provides for detecting one or more conductive objects such as fingertips 408 touching and/or hovering over the digitizer 316 at the same time (multi touch). In some examples, the digitizer control module 300 alternates between scanning the digitizer 316 for detection of one or more fingertips 408 and sampling outputs on both the horizontal and vertical electrodes 402, 404 for location of a signal transmitted by the stylus 100.

The stylus 100 has a tip transmitter located in its tip 102 and the digitizer 316 is able to detect the position of the stylus tip 102 with respect to the digitizer grid by detecting the signal transmitted by the tip transmitter.

In various examples, the stylus has a tilt transmitter. The digitizer 316 is able to detect tilt of the stylus 100 with respect to the plane of the digitizer 316 where the stylus 100 has a tilt transmitter in addition to a transmitter at the tip 102 of the stylus. The stylus 100 contains a transmitter at its tip 102 which transmits a first signal and it contains a second transmitter (referred to as a tilt transmitter) at a tilt point of the transmitter which transmits a second signal, different from the first signal. The control module 300 computes the location on the digitizer 316 of the tip 102 of the stylus 100 using the first signal. The control module 300 computes the location on the digitizer 316 of the signal received from the tilt point of the stylus 100 using the second signal. The control module 300 knows the length of the stylus 100 and is thus able to compute by triangulation the angle between the longitudinal axis of the stylus 100 and the plane of the digitizer 316.

In various examples the stylus has a plurality of transmitters configured to enable the digitizer 316 and control module 300 to detect rotation of the stylus 100. The digitizer 316 is able to detect position of a distal end of the stylus 100 where the stylus 100 has at least one transmitter at its distal end. Where the distal end of the stylus 100 is used as an eraser the distal end transmitter is referred to as an eraser transmitter.

Figure 5:
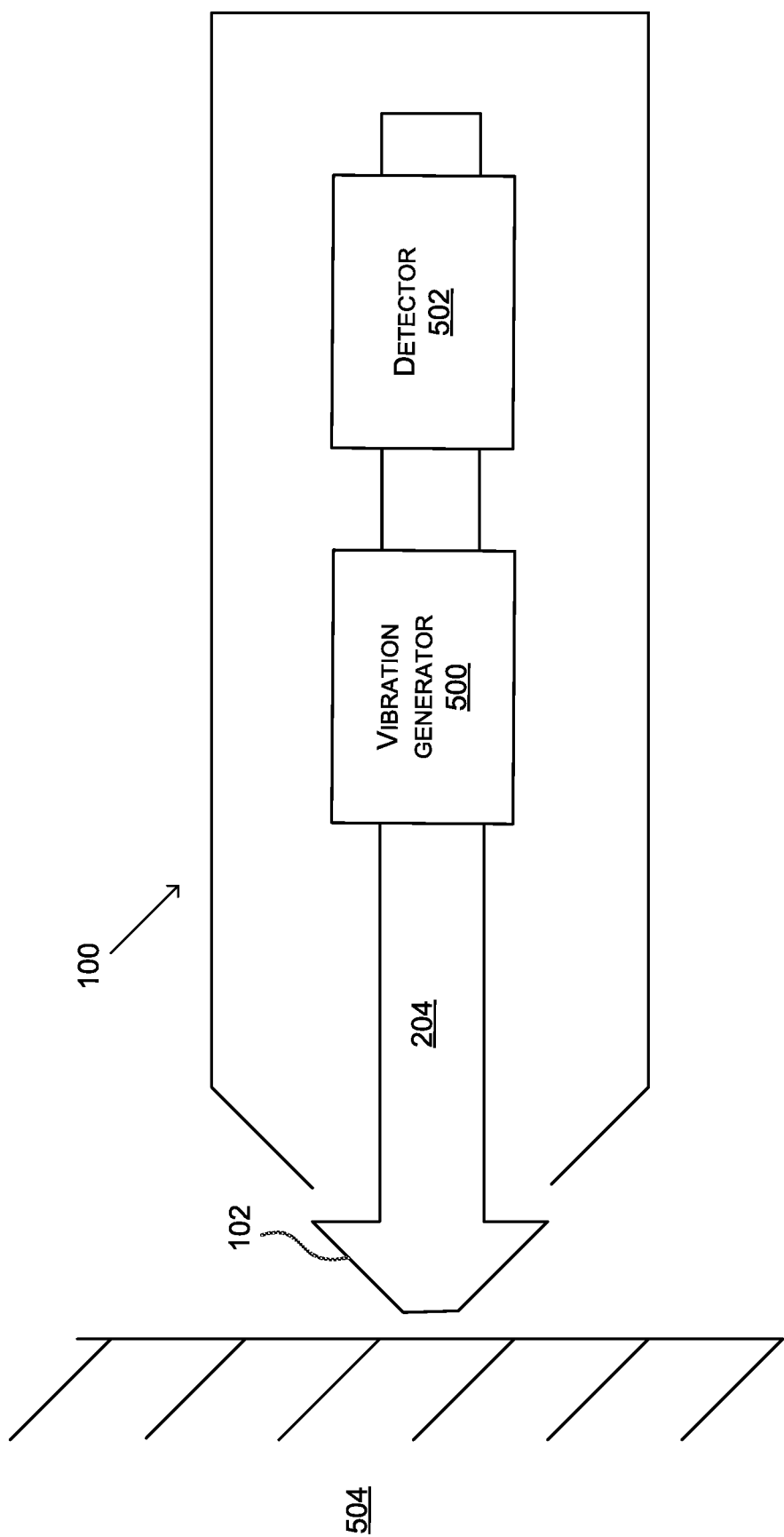
FIG. 5 is a schematic longitudinal cross-section through a stylus with a vibration generator and a detector.

FIG. 5 is a cross-section through a stylus 100 comprising a vibration generator 500 and a detector 502. Within the stylus is a shaft 204 running longitudinally within a housing of the stylus. The shaft 204 has stylus tip 102 at one end of the shaft 204 protruding from the stylus housing 200. A vibration generator 500 is housed in the stylus housing and is connected to the shaft 204 and arranged to generate vibration of the stylus tip in a direction along the longitudinal axis of the shaft. The stylus housing also houses a detector 502 configured to detect contact between the stylus tip and a surface 504 external to the stylus. In various examples the detector detects disturbance in vibrational motion of the stylus tip caused by contact with the surface. There are various different ways in which the detector operates as described in more detail below. In some cases the disturbance in vibrational motion is detected as a disturbance in voltage or a disturbance in current. In some cases the disturbance in vibrational motion is detected by detecting force using any one or more of: an optical sensor, a capacitive sensor, a strain gauge. In some cases the detector 502 comprises both a force sensor and a detector for detecting disturbance in vibrational motion as a disturbance in voltage or current. In the example of FIG. 5 the detector 502 is located at the distal end of the shaft 204 although it is not essential to use that location as the detector is housed at other locations in the stylus in some examples.

The surface 504 external to the stylus 100 is any relatively rigid surface such as a table, a cardboard menu, a sheet of paper or other surface. In one example, the surface 504 comprises a digitizer panel, for example, where the surface 504 is a touch screen display of a tablet computer, a wearable computer, an interactive white board, or other electronic ink surface.

In some examples the vibration generator 500 and detector 502 are driven by control circuitry in the stylus (not shown in FIG. 5 for clarity) according to a defined protocol. In an example, the control circuitry drives the vibration generator such that it causes vibration of the stylus tip during repeating time windows. These time windows are referred to herein as zero-force windows. The control circuitry drives the detector 502 to detect presence of the external surface in contact with the stylus tip during the zero force windows. Interleaved with the zero force windows are one or more other types of windows, for example, windows of time where a tip transmitter of the stylus is driven, windows of time where a tilt transmitter of the stylus is driven, windows of time where data is transferred from the stylus to a digitizer control module of an associated digitizer panel.

There are various options for implementing the vibration generator 500 and the detector 502. Non-limiting examples of these options are given with reference to FIGS. 6, 7 and 8.

Figure 6:
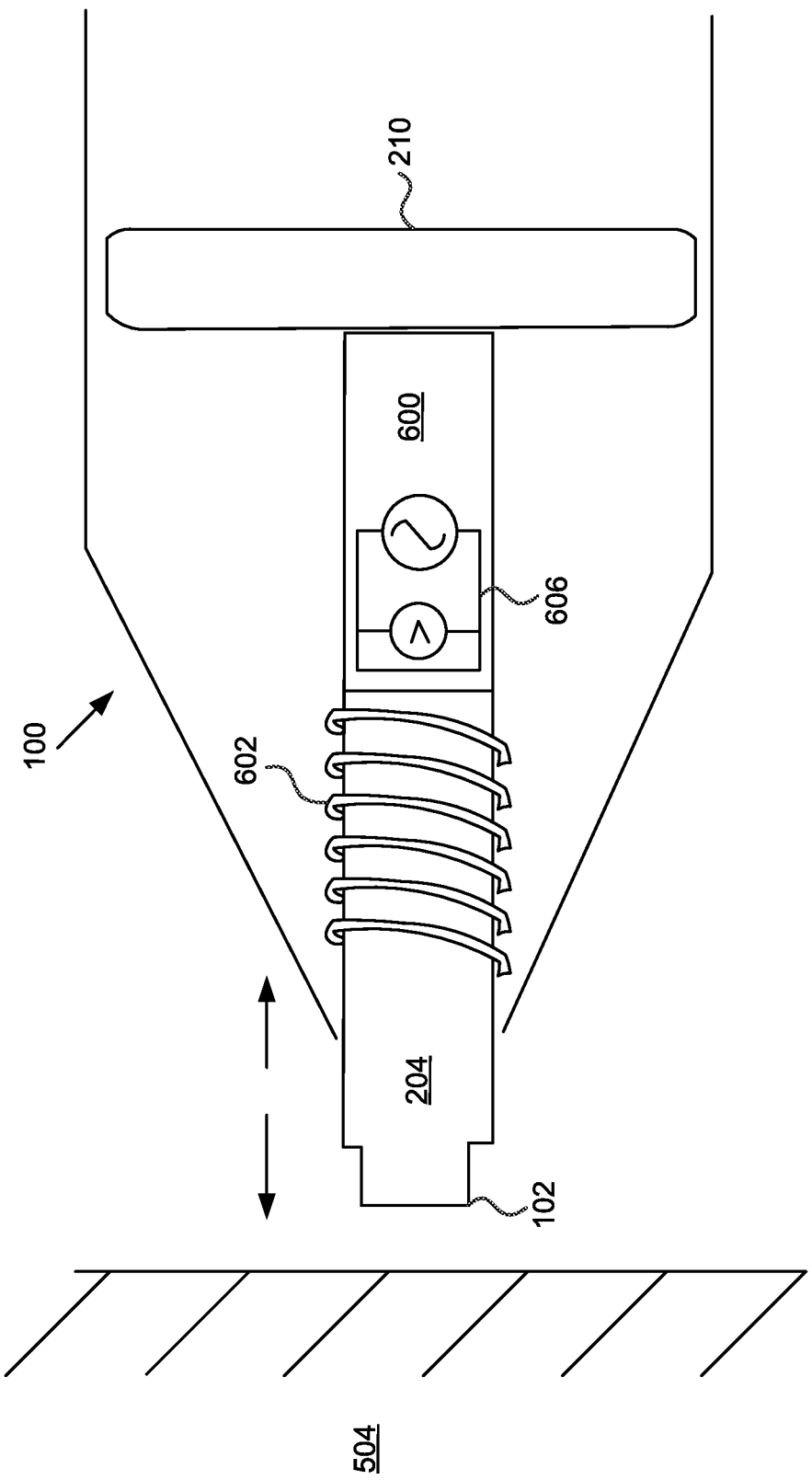
FIG. 6 is an example of a stylus comprising a vibration generator with a coil driven by an alternating current (AC) source.

FIG. 6 is an example of a stylus 100 wherein the vibration generator 500 comprises a coil 602 of conductive wire. The coil is positioned with respect to the shaft 204, for example, by being wound around the shaft 204, in order to generate vibration of the stylus tip 102 using the principle of electromagnetism as now explained. The coil is supported in the housing of the stylus such that it remains substantially static in use whereas the stylus tip and shaft 204 is able to vibrate longitudinally with respect to the longitudinal axis of the coil. The part of the shaft 204 that passes through the coil 602 is magnetic, causing vibration of the tip 102 when an alternating current is passed through the coil 602. The part of the shaft 204 that passes through the coil 602 is either magnetic due to being formed from magnetic material, or is connected to a magnetic element housed in the stylus housing in order to confer magnetic properties to the part of the shaft that passes through the coil. The coil is positioned in the housing of the stylus such that it does not cause physical or electrical interference with other components such as the tilt transmitter, tip transmitter or other components. Using a coil to generate the vibration gives a compact solution which is simple to manufacture and gives effective vibration for detecting zero-force events.

The vibration generator 500 comprises circuitry to drive alternating (AC) current into the coil 602 during the zero-force window, causing the tip 102 to vibrate along the longitudinal axis of the stylus 100 generally according to the AC drive signal. The shaft 204 is supported in the housing of the stylus in such a manner as to allow for the vibration to occur without damage to other components within the stylus. In some examples, the vibration generator operates to generate vibrations of the stylus tip at a frequency and amplitude which is barely noticeable to a user of the stylus, from the point of view of auditory and/or tactile senses of the user. In this way the user is able to operate the stylus without being disconcerted or distracted by the vibration.

When the tip 102 touches the surface 504 during the zero force window, the vibration temporarily causes the tip 102 to touch the surface 504 with force (where the amplitude of the vibration is greater than or equal to the distance between the stylus tip resting position and the external surface 504. The contact event between the stylus tip and the surface 504 is detectable by a force sensor 604 by measuring the temporary force on the tip 102 as described in more detail below with reference to FIG. 8.

In the example of FIG. 6, the detector 502 comprises detector circuitry connected to coil 602. In one example, the detector circuitry measures the AC voltage across the coil 602 during the zero force window. When the vibration of the tip 102 is disturbed because of contact of the tip 102 and the surface 504, there is a resulting disturbance in a voltage pattern across the coil 602 during the zero force window. For example, when there is no contact between the stylus tip and the surface 504 the voltage across the coil has an average value of X volts during the zero force window but when there is contact between the stylus tip and the surface 504 the average value of the voltage across the coil is less than X volts since motion of the stylus tip with respect to the coil is reduced. Contact between the tip 102 and the surface 504 is detectable by circuitry connected to the coil 602 on the basis of the disturbance in the voltage pattern.

In another example, the coil detector circuitry measures AC current in the coil 602 and drives AC voltage across the coil. In this example, when the tip 102 touches the surface 504 during the zero force window, the vibration of the tip 102 is disturbed, causing a disturbance in a current pattern in the coil 602. Contact between the tip 102 and the surface 504 is detectable by the detector circuitry on the basis of the disturbance in the current pattern. For example, when there is no contact between the tip 102 and the surface the average current is X and when there is contact between the tip 102 and the surface the average current is less than X due to restriction on motion between the coil and the tip 102.

Figure 7:
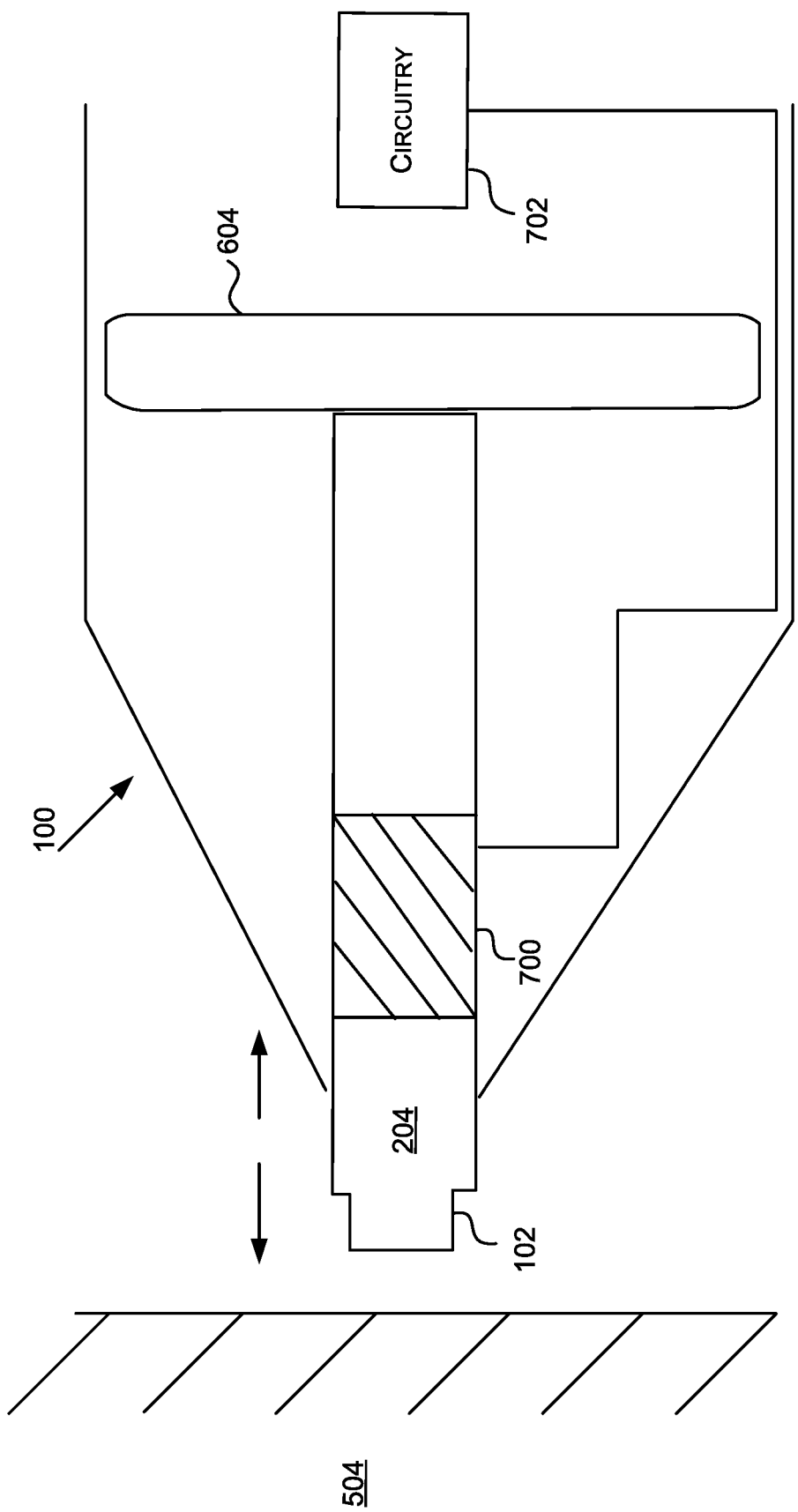
FIG. 7 is an example of a stylus comprising a vibration generator with a piezoelectric component.

FIG. 7 is an example of a stylus 100 wherein the vibration generator 500 comprises circuitry 702 and a piezoelectric component 700. The tip 102 is connected to the piezoelectric component 700, for example, by having the piezoelectric component 700 integral with the shaft or by having the piezoelectric component 700 connected to the tip 102 or to the shaft. The piezoelectric component 700 is positioned so that when activated, it pushes the tip 102 towards the tip end of the stylus. The tip 102 and shaft are supported within the stylus housing so that they are biased towards a resting position of the stylus in which the stylus tip is protruding from the stylus housing but is not at its maximum extent of protrusion from the stylus housing. When the piezoelectric component is deactivated the tip 102 and shaft return to the resting position of the stylus. The circuitry 702 of the vibration generator is configured to apply voltage pulses to the piezoelectric component 700, causing the tip 102 to vibrate along the longitudinal axis of the stylus 100. When the tip 102 touches a surface 504 during the zero force window, the vibration temporarily causes the tip 102 to touch the surface 504 with force. This contact is detectable by the force sensor 604 by measuring the temporary force on the tip 102. In one example, the force sensor 604 comprises an optical sensor. In an alternative example, the force sensor 604 is a capacitive sensor. In an alternative example, the force sensor 604 is a strain gauge.

Figure 8:
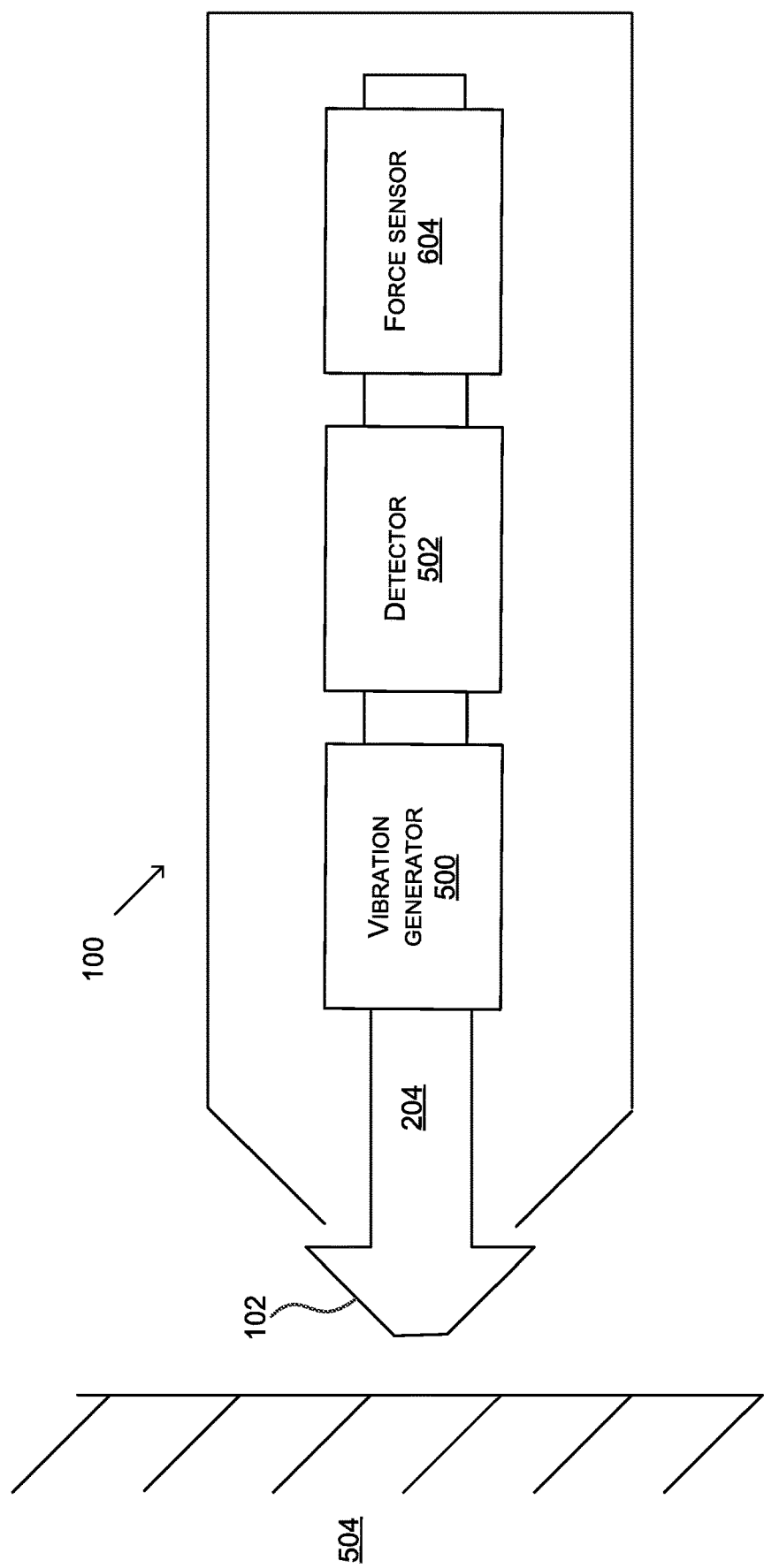
FIG. 8 is an example of a stylus comprising a force sensor.

FIG. 8 is an example of a stylus comprising a force sensor 604. In one example, the force sensor 604 comprises an optical sensor. In an alternative example, the force sensor 604 is a capacitive sensor. In an alternative example, the force sensor 604 is a strain gauge. In one example, the detector 502 is force sensor 604. In an alternative example, the force sensor 604 is separate to the detector 502. Any suitable combinations of optical sensor, capacitive sensor and strain gauge is used as the force sensor 604 some examples. In various examples the force sensor 604 uses a threshold and detects the presence of surface 504 when the force detected at the force sensor 604 is greater than the threshold during the zero force window.

Figure 9:
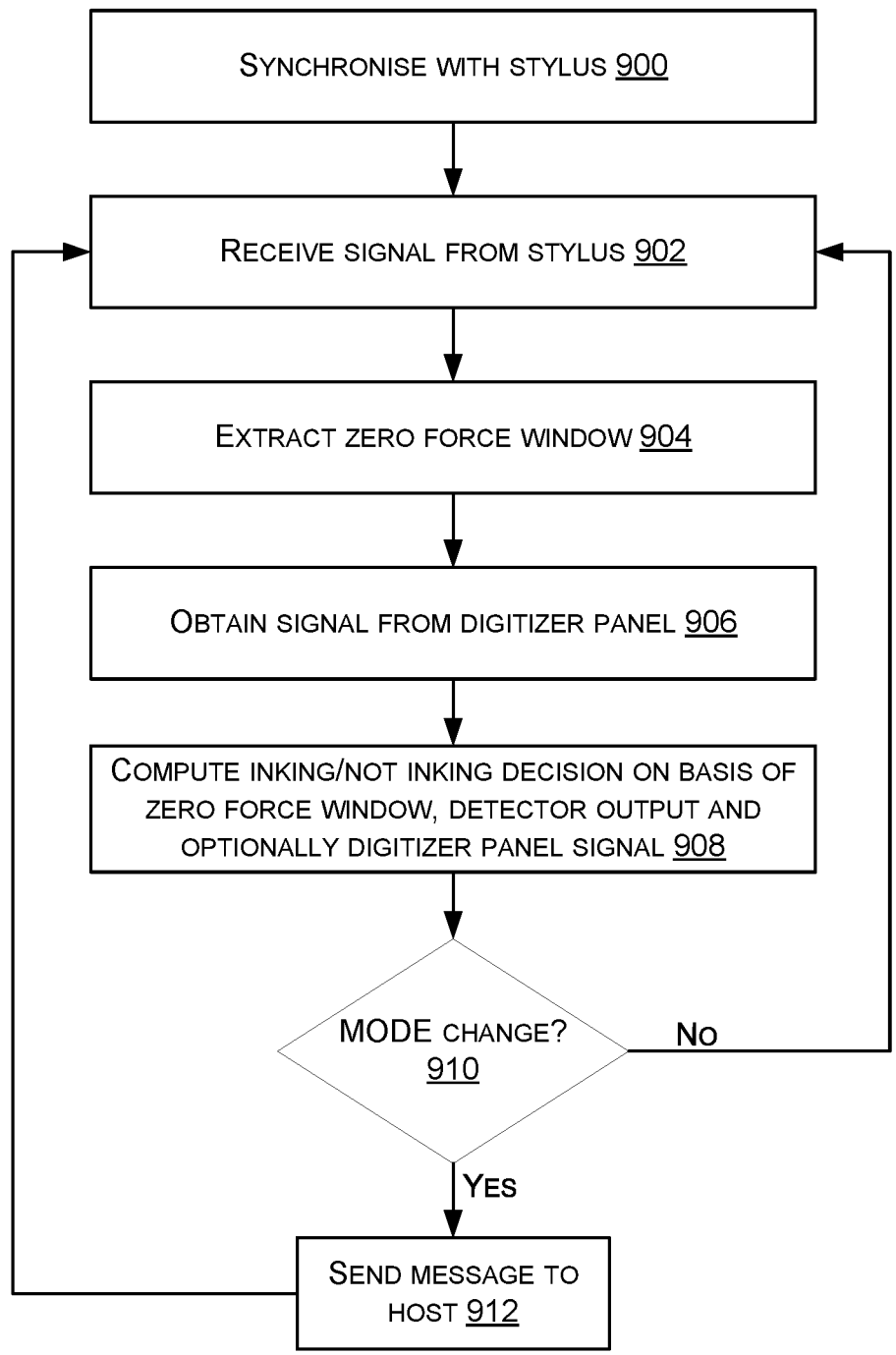
FIG. 9 is a flow diagram of a method at a digitizer control module for computing a tip-detection decision.

FIG. 9 is an example of a method at a digitizer control module 300 for computing a tip-detection decision, wherein a tip-detection decision indicates the determination of contact between a stylus tip 102 and a surface 504.

At block 900 the digitizer control module synchronizes with a stylus 100. The control module 300 of the digitizer 316 manages a synchronization signal for synchronizing signal bursts emitted by stylus 100 with sampling windows of the digitizer control module.

At block 902 the digitizer control module receives a signal from the stylus 100. The signal comprises a series of time windows according to a predefined protocol known to the digitizer control module. The digitizer control module extracts 904 the zero force window from the received signal as this part of the signal contains information from the detector about events whilst the stylus tip is vibrating.

The digitizer control module also obtains 906 a signal from the digitizer panel which contains information about any signal from the stylus detected by the digitizer control module during a time corresponding to the extracted zero force window from step 904.

The digitizer control module computes an inking/not inking decision on the basis of the zero-force window data from the stylus, and the data about the signal from the stylus detected by the digitizer in a corresponding time window. The inking/not inking decision enables a mode change from inking mode to non-inking mode and vice versa where a host computing device is a tablet computer or other electronic ink display device.

Block 910 illustrates the determination of a mode change by the digitizer control module 300. An example of a mode of a host computing device of a digitizer control module 300 is inking mode, wherein electronic ink can be produced. An alternative example of a mode of a host computing device associated with the digitizer control module 300 is a not inking mode, wherein electronic ink cannot be produced.

If, at block 910, the digitizer control module 300 determines that a mode change has not occurred, the method returns to block 902.

If, at block 910, the digitizer control module 300 determines that a mode change has occurred, the method progresses to block 912.

Block 912 illustrates sending a message to the host computing device. In one example, the message includes a notification that a mode change has occurred from inking mode to not inking mode. In an alternative example, the message includes a notification that a mode change has occurred from not inking mode to inking mode. The method then reverts to block 902.

Figure 10:
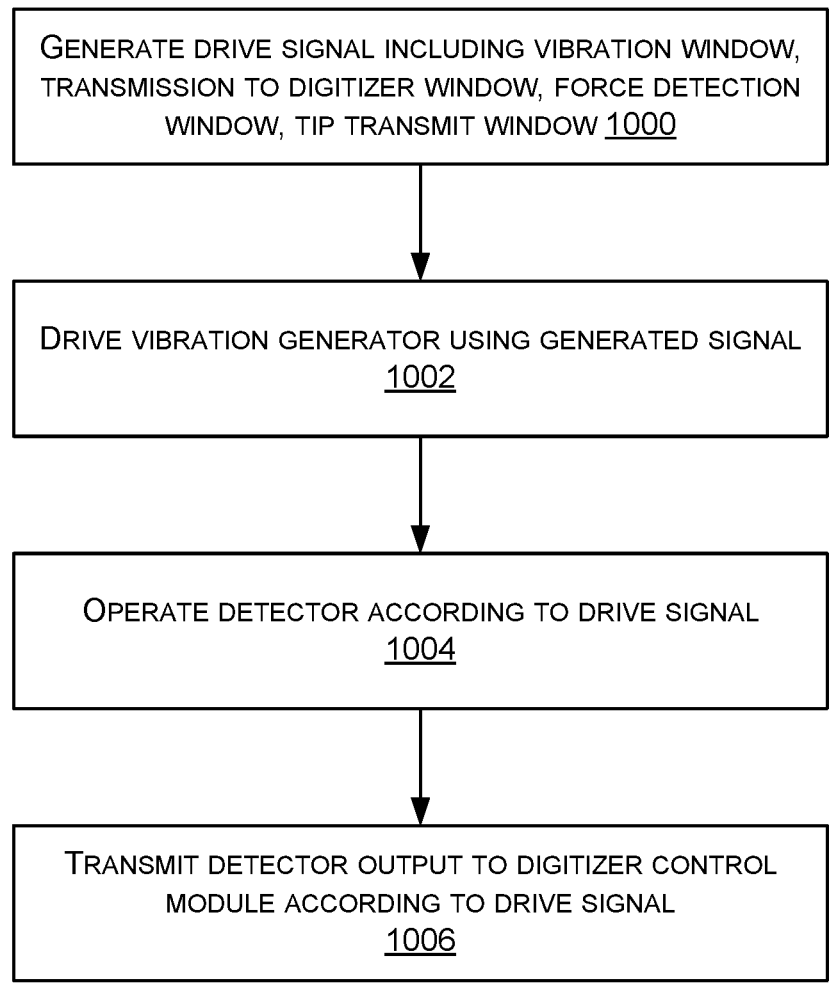
FIG. 10 is a flow diagram of a method at a stylus for transmitting output to a digitizer control module for use in the method of FIG. 9.

FIG. 10 is a flow diagram of a method performed by the circuitry in the stylus for transmitting output to the digitizer control module 300.

Block 1000 illustrates generating a drive signal in the stylus. The drive signal includes the zero force window, a transmission to digitizer window, a force detection window and a tip transmit window. The drive signal comprises operating the time windows in series. The drive signal is cyclical. During the transmission to digitizer window the stylus sends a signal to the digitizer control module 300 about the results of the detector. During the zero force detection window the stylus tip vibrates. During the tip transmit window a tip antenna of the stylus is driven.

Block 1002 illustrates driving the vibration generator 504 using the generated signal. In one example, the generated drive signal drives AC current into a coil 602 of conductive wire, causing the tip 102 to vibrate along the longitudinal axis. In an alternative example, the detector 502 measures AC current across the coil 602 and the vibration generator 500 drives AC voltage. In an alternative example, the generated drive signal excites the piezoelectric component 700 by applying voltage pulses, causing the tip to move or vibrate along the longitudinal axis.

Block 1004 illustrates operating the detector 502 according to the drive signal so that the detector detects events in the zero force window whilst the stylus tip is vibrating. In one example, the detector 502 measures voltage or current on a coil 602 of conductive wire. In another example, the detector is a force sensor 604 wherein the force sensor 604 is an optical sensor, a capacitive sensor or a strain gauge. The detector 502 detects whether contact without pressure has been made on the basis of the drive signal. In some examples, the level of force of contact between the stylus tip and capacitive digitizer sensor is measured.

Block 1006 illustrates transmitting the detector 502 output to the digitizer control module 316 according to the drive signal. In this way the digitizer control module 316 obtains information about events the detector 502 detects.

The vibration generator and detector of the stylus operate in an unconventional manner to achieve accurate detection of zero force events between the stylus and a surface external to the stylus.

The vibration generator and detector of the stylus improve the functioning of the stylus by enabling more accurate detection of zero force events between the stylus and a surface external to the stylus.

Alternatively or in addition to the other examples described herein, examples include any combination of the following:

Clause A. A stylus for use with a digitizer, the stylus comprising:
a shaft running on a longitudinal axis of the stylus and having a stylus tip at a tip end of the shaft;
a vibration generator configured to vibrate the stylus tip along the longitudinal axis;
a detector configured to detect the vibration causing the stylus tip to contact a surface external to the stylus. By using a stylus comprising a detector and a vibration generator, zero force activation between the stylus tip and an external surface is detectable. Currently, interaction between a stylus tip and a surface is purely mechanical, such that sensing contact without force is challenging.

Clause B. The stylus of clause A wherein the detector is configured to detect when the vibration causes the stylus tip to contact a surface external to the stylus by detecting disturbance in vibrational motion of the stylus tip caused by contact with the surface. Upon contact without pressure with the surface, the vibrational motion of the tip is disturbed. As the detector can detect this disturbance, zero force contact between the tip and the surface is detectable.

Clause C. The stylus of clause A or clause B wherein the detector is configured to detect the disturbance in vibrational motion as a disturbance in voltage or a disturbance in current. Detecting disturbance in vibrational motion as a disturbance in voltage or a disturbance in current is a practical, accurate and robust way of detecting the disturbance.

Clause D. The stylus of clause A or clause B or clause C wherein the detector comprises a coil of conductive wire around the shaft and wherein at least part of the shaft within the coil is magnetic. The composition of the coil of conductive wire and at least part of the shaft within the coil being magnetic means that the detector can act as an electromagnet.

Clause E. The stylus of clause D wherein the detector comprises circuitry which detects disturbance in the vibrational motion of the stylus tip caused by contact with the surface as a disturbance in a voltage pattern across the coil, or in a disturbance in a current pattern in the coil. The circuitry enables the detector to detect a change in the voltage pattern or the current pattern, indicating the presence of zero force contact.

Clause F. The stylus of any of clauses A to E wherein the detector comprises any one or more of an optical sensor, a capacitive sensor, and a strain gauge. The detector may comprise one or more of these alternatives to give a broader range of potential detection mechanisms for detecting zero force contact with an external surface.

Clause G. The stylus of any of clauses A to F wherein the detector comprises a pressure sensor at a distal end of the shaft. A pressure sensor allows the force of contact between the external surface and the stylus tip to be measured.

Clause H. The stylus of any preceding clause wherein the vibration generator comprises circuitry to drive an alternating current in the coil such that the stylus tip vibrates. A means of generating vibration in the tip is useful to temporarily cause forceful contact between the tip and the external surface.

Clause I. The stylus of any preceding clause wherein the vibration generator comprises a piezoelectric component. Using a piezoelectric component is a compact, and cost effective way of generating vibration in the tip to temporarily cause forceful contact between the tip and the external surface.

Clause J. The stylus of clause I wherein the piezoelectric component is integral with the shaft. The composition of the piezoelectric component within the shaft enables the piezoelectric component to act as a vibration generator and a detector for zero force contact. The arrangement of a piezoelectric component in the shaft is a space saving solution.

Clause K. The stylus of any preceding clause wherein the vibration generator operates during repeating zero-force windows, and wherein the detector is configured to detect when the vibration causes the stylus tip to contact a surface external to the stylus, during the repeating zero-force windows. The vibration of the tip is inducible during a protocol cycle to temporarily cause force to be exerted on a surface so that contact without pressure is detectable.

Clause L. The stylus of any preceding clause wherein the vibration generator operates to generate vibration of the stylus tip at a frequency above a level of human tactile perception. The frequency of the vibration is above the level of human tactile perception so that the user operating the stylus is not able to detect the vibration of the tip during use. The duty cycle of the "zero-force" window is low enough in some examples so that the human will not perceive it, even if the vibration frequency itself is possible to sense. In an example, the duty cycle of the zero-force window is such that the stylus tip vibrates at only about 10% of the time.

Clause M. The stylus of any preceding clause wherein the stylus tip and shaft are moveably supported in a housing of the stylus such that vibration of the stylus tip is possible whilst a housing of the stylus remains generally static. In this way the stylus is robust and practical and does not fail or break as a result of the vibrations.

Clause N. The stylus of any preceding clause wherein the detector is configured to send information to a digitizer control module of a digitizer panel, about when the vibration causes the stylus tip to contact a surface external to the stylus. In this way, the information about zero force contact is conveyed to the digitizer panel in an efficient manner.

Clause O. A method of operation of a stylus comprising:
operating a vibration generator to vibrate a tip of the stylus along a longitudinal axis of the stylus;
operating a detector to detect the vibration causing the stylus tip to contact a surface external to the stylus. A vibration cycle of the stylus tip can be activated. Upon contact without pressure with an external surface, the vibration of the stylus tip causes a temporary force on the surface, such that the contact is detectable.

Clause P. The method of clause O comprising operating the detector to detect when the vibration causes the stylus tip to contact a surface external to the stylus by detecting disturbance in vibrational motion of the stylus tip caused by contact with the surface. Detecting disturbance in vibrational motion is a practical and effective way of detecting contact with the surface.

Clause Q. The method of clause P comprising detecting the disturbance in vibrational motion by detecting a disturbance in voltage or a disturbance in current. Detecting a disturbance in voltage or a disturbance in current is a practical and accurate approach.

Clause R. The method of any of clauses O to Q comprising operating the vibration generator at repeating time windows, and operating the detector during the repeating time windows. The vibration of the tip is inducible during a protocol cycle to temporarily cause force to be exerted on a surface during the cycle and so that contact without pressure is detectable by the detector during the cycle.

Clause S. The method of any of clauses O to Q comprising sending information to a digitizer control module of a digitizer panel, about when the vibration causes the stylus tip to contact a surface external to the stylus. The information about zero force contact is conveyed to the digitizer panel.

Clause T. A method of operation of a digitizer control module of a digitizer panel, the method comprising:
receiving information from a detector at the stylus about when vibration of a tip of the stylus causes the stylus tip to contact a surface external to the stylus;
detecting a signal from the stylus at the digitizer panel;
determining whether or not to trigger an inking mode of the digitizer panel on the basis of both the received information and the detected signal from the stylus. The circuitry in the digitizer panel receives two sources of decision about the potential contact between the tip and the surface, yielding greater accuracy for detecting zero force contact.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A stylus for use with a digitizer, the stylus comprising:
   a shaft on a longitudinal axis of the stylus and having a stylus tip at a tip end of the shaft;
   a vibration generator configured to vibrate the stylus tip along the longitudinal axis during a time window in which contact of the stylus tip to a surface external to the stylus is not detected;
   a detector configured to detect the stylus tip contacting the surface external to the stylus during the time window as a result of the vibrating.

2. The stylus as claimed in claim 1 wherein the detector is configured to detect when the vibration causes the stylus tip to contact a surface external to the stylus by detecting disturbance in vibrational motion of the stylus tip caused by contact with the surface.

3. The stylus of claim 2 wherein the detector is configured to detect the disturbance in vibrational motion as a disturbance in voltage or a disturbance in current.

4. The stylus of claim 1 wherein the detector comprises a coil of conductive wire around the shaft and wherein at least part of the shaft within the coil is magnetic.

5. The stylus of claim 4 wherein the detector comprises circuitry which detects disturbance in the vibrational motion of the stylus tip caused by contact with the surface as a disturbance in a voltage pattern across the coil, or in a disturbance in a current pattern in the coil.

6. The stylus of claim 1 wherein the detector comprises any one or more of an optical sensor, a capacitive sensor, and a strain gauge.

7. The stylus as claimed in claim 1 wherein the detector comprises a pressure sensor at a distal end of the shaft.

8. The stylus of claim 1 wherein the vibration generator comprises circuitry to drive an alternating current in the coil such that the stylus tip vibrates.

9. The stylus of claim 1 wherein the time window is a period in which force of the stylus tip to the surface is not detected or is zero.

10. The stylus of claim 9 wherein the vibration generator comprises a piezoelectric component and wherein the piezoelectric component is integral with the shaft.

11. The stylus of claim 9 wherein the vibration generator comprises a piezoelectric component and wherein the vibration generator operates during repeating zero-force windows, and wherein the detector is configured to detect when the vibration causes the stylus tip to contact a surface external to the stylus, during the repeating zero-force windows.

12. The stylus of claim 1 wherein the vibration generator operates to generate vibration of the stylus tip at a frequency above a level of human tactile perception; or where the vibration generator operates at around 10% of the operation time of the stylus.

13. The stylus of claim 1 wherein the stylus tip and shaft are moveably supported in a housing of the stylus such that vibration of the stylus tip is possible whilst a housing of the stylus remains generally static.

14. The stylus of claim 1 wherein the detector is configured to send information to a digitizer control module of a digitizer panel, about when the vibration causes the stylus tip to contact a surface external to the stylus.

15. A method of operation of a stylus comprising:
   operating a vibration generator to vibrate a tip of the stylus along a longitudinal axis of the stylus during a time window in which contact of the stylus tip to a surface external to the stylus is not detected;
   operating a detector to detect the stylus tip contacting the surface external to the stylus during the time window as a result of the vibrating.

16. The method of claim 15 comprising operating the detector to detect when the vibration causes the stylus tip to contact a surface external to the stylus by detecting disturbance in vibrational motion of the stylus tip caused by contact with the surface.

17. The method of claim 16 comprising detect the disturbance in vibrational motion by detecting a disturbance in voltage or a disturbance in current.

18. The method of claim 15 comprising operating the vibration generator at repeating time windows, and operating the detector during the repeating time windows.

19. The method of claim 15 comprising sending information to a digitizer control module of a digitizer panel, about when the vibration causes the stylus tip to contact a surface external to the stylus.

20. A method of operation of a digitizer control module of a digitizer panel, the method comprising:
   vibrating a tip of a stylus along a longitudinal axis during a time window in which contact of the tip of the stylus to a surface external to the stylus is not detected;
   receiving information from a detector at the stylus about when the vibrating of the tip of the stylus causes the stylus tip to contact the surface external to the stylus during the time window as a result of the vibrating;
   detecting a signal from the stylus at the digitizer panel;
   determining whether or not to trigger an inking mode of the digitizer panel on the basis of both the received information and the detected signal from the stylus.

* * * * *